United States Patent
Nakanishi et al.

(10) Patent No.: US 6,183,090 B1
(45) Date of Patent: Feb. 6, 2001

(54) PROJECTION TYPE IMAGE DISPLAY APPARATUS

(75) Inventors: Hiroshi Nakanishi, Sakurai; Ikuo Takahara, Nara; Hiromi Kato, Nara; Hiroshi Hamada, Nara, all of (JP)

(73) Assignee: Sharp Kabushiki Kaisha, Osaka (JP)

(*) Notice: Under 35 U.S.C. 154(b), the term of this patent shall be extended for 0 days.

(21) Appl. No.: 09/098,455

(22) Filed: Jun. 17, 1998

(30) Foreign Application Priority Data

Jun. 20, 1997 (JP) .................................................... 9-180486

(51) Int. Cl.[7] ................................................... G03B 21/14
(52) U.S. Cl. ............................ 353/20; 353/31; 349/9
(58) Field of Search ........................ 353/34, 33, 20, 353/30, 31; 359/483, 487, 488, 495, 500

(56) References Cited

U.S. PATENT DOCUMENTS

| | | | | |
|---|---|---|---|---|
| 3,893,758 | * | 7/1975 | Hunzinger et al. | 353/122 |
| 4,427,741 | * | 1/1984 | Aizawa | 359/483 |
| 4,446,305 | | 5/1984 | Rogers et al. | |
| 4,913,529 | * | 4/1990 | Goldenberg et al. | |
| 4,969,730 | * | 11/1990 | Van Den Brandt | 353/34 |
| 5,239,322 | * | 8/1993 | Takanashi et al. | 353/31 |
| 5,365,287 | * | 11/1994 | Vollmer et al. | 353/31 |
| 5,374,968 | * | 12/1994 | Haven et al. | 353/20 |
| 5,379,135 | * | 1/1995 | Nakagaki et al. | 359/40 |
| 5,699,188 | * | 12/1997 | Gilbert | 359/584 |
| 5,706,063 | * | 1/1998 | Hong | 349/9 |
| 5,748,369 | * | 5/1998 | Yokota | 353/20 |
| 5,764,412 | * | 6/1998 | Suzuki | 359/487 |
| 5,765,934 | * | 6/1998 | Okamori | 353/38 |
| 5,798,819 | * | 8/1998 | Hattori et al. | 353/20 |
| 5,826,959 | * | 10/1998 | Atsuchi | 353/20 |
| 5,826,960 | * | 10/1998 | Gotoh et al. | 353/20 |
| 5,886,754 | * | 3/1999 | Kuo | 349/8 |
| 5,900,976 | * | 5/1999 | Handschy et al. | 359/495 |
| 5,982,541 | * | 11/1999 | Li et al. | 353/20 |

FOREIGN PATENT DOCUMENTS

| | | |
|---|---|---|
| 57-158801 | 9/1982 | (JP) . |
| 63-39294 | 2/1988 | (JP) . |
| 5-341254 | 12/1993 | (JP) . |
| 6-281814 | 10/1994 | (JP) . |
| 8-160374 | 6/1996 | (JP) . |
| 8-211357 | 8/1996 | (JP) . |
| 9-80356 | 3/1997 | (JP) . |

OTHER PUBLICATIONS

Tanaka et al., "Flat–Panel Display 1998", New Market Development (2), Part 4–2, 1998, pp. 158–161 (partial translation).

Murayama, Current Status and Future Application of Reflective LCD Projector, Pioneer Corporation, Electronic Display Forum 97 Proceedings, Apr. 16–18, 1997, pp. 3–27–3–32.

* cited by examiner

*Primary Examiner*—William Dowling
(74) *Attorney, Agent, or Firm*—Nixon & Vanderhye P.C.

(57) ABSTRACT

A projection type image display apparatus of the present invention includes: a light source; a polarization selective reflection element having a function of reflecting or transmitting a light beam from the light source in accordance with a polarization direction thereof; and an element for modulating a polarization plane of an incident light beam in accordance with an image to be displayed. The polarization selective reflection element is film-like and has an optical transmission axis and an optical reflection axis. The polarization selective reflection element transmits a first linearly polarized light beam, and reflects a second linearly polarized light beam having a polarization plane orthogonal to a polarization plane of the first linearly polarized light beam, regardless of a direction of incidence of a light beam with respect to the polarization selective reflection element.

20 Claims, 12 Drawing Sheets a: Light beam having an angle with respect to optical axis b: Light beam which is substantially parallel to optical axis

PROJECTION TYPE IMAGE DISPLAY APPARATUS

BACKGROUND OF THE INVENTION

1. Field of the Invention

The present invention relates to a projection type image display apparatus, such as a liquid crystal projector, which modulates light from a light source by an image display element, and enlarges and projects the modulated light by a projection lens.

2. Description of the Related Art

Examples of projection type image display apparatuses having an optical system which performs polarization separation and synthesis of light from a light source are disclosed, for example, in Japanese Laid-Open Publication No. 63-39294 and Japanese Laid-Open Publication No. 8-160374.

First, a projection type image display apparatus disclosed in Japanese Laid-Open Publication No. 63-39294 is described below.

A schematic view of the structure of the apparatus is shown in FIG. 1.

A light beam emitted by a light source 12 passes through a collimating lens 13, and is separated into two orthogonal linearly polarized light beams by a polarization beam splitter 14 (henceforth referred to simply as "PBS") having a square pole shape. One of the separated polarized light beams is reflected by the PBS 14, and is incident upon a color separating prism 15. The color separating prism 15 includes a first prism 15A, a second prism 15B and a third prism 15C. On a second plane 15e of the first prism 15A, a thin dichroic interference film which reflects a blue light beam and transmits a light beam having a longer wavelength than that of the blue light beam, is vapor-deposited. There is a gap between the first prism 15A and the second prism 15B. On a plane 15f between the second prism 15B and the third prism 15C, a thin dichroic interference film which reflects a red light beam and transmits a green light beam is deposited. Therefore, when white light is incident upon an incident plane 15a, blue light included therein is reflected by the plane 15e, is totally and internally reflected by the plane 15a and heads towards an output plane 15b. Green light which passed through the plane 15f heads towards an output plane 15d. Reference numerals 16, 17 and 18 represent liquid crystal display elements for displaying a blue image, a red image and a green image respectively. Dielectric reflecting mirrors 19, 20 and 21 are provided on the back of the liquid crystal display elements 16, 17 and 18 respectively. The light beam separated by each of the prisms 15A, 15B and 15C passes through the liquid crystal display elements 16, 17 and 18 respectively, is reflected by the reflecting mirrors 19, 20 and 21 respectively, and passes through the liquid crystal display elements 16, 17 and 18 respectively again. The light beams reflected by the liquid crystal display elements 16, 17 and 18 are synthesized by the color separating prism 15, and the synthesized light beam is incident upon the PBS 14 again. The component of the incident light beam which had the polarization direction thereof modulated by the liquid crystal display elements 16, 17 and 18 in response to an image signal, passes through the PBS 14 and is projected on a screen 7 by a projection lens 6.

Next, a projection type image display apparatus disclosed in Japanese Laid-Open Publication No. 8-160374 is described below.

A schematic view of the structure of the apparatus is shown in FIG. 2.

Reference numeral 22 represents a projection light source which includes a light source and a reflecting mirror for converging the light beam emitted by the light source. The emitted light beam passes through an IR-UV cutting filter 22' which blocks unnecessary infrared radiation and ultraviolet radiation, and enters PBS 23, where the light beam is separated by a polarization separation plane 23-1 into a P polarized light beam and an S polarized light beam which are orthogonal to each other.

The S polarized light beam which was reflected by the polarization separation plane 23-1 is separated into red, green and blue light beams by dichroic mirrors 24, 25 and 26 respectively. These separated light beams are respectively incident upon a liquid crystal display panel for red 27, a liquid crystal display panel for green 28 and a liquid crystal display panel for blue 29, where the polarization direction of the light beams are rotated in response to an image signal. The resultant light beams are incident upon dichroic mirrors 30, 31 and 32 respectively, and then upon another PBS 33. The P polarized light beam passes through the PBS 33, and is enlarged and projected on a screen 7 by a projection lens 34. The P polarized light beam which passed through the PBS 23 is incident upon a liquid crystal display panel 35. The component of the incident light beam which had the polarization direction thereof modulated by the liquid crystal display panel 35, is reflected by the PBS 33, passes through the projection lens 34, and is enlarged and projected on the screen 7 as a luminance signal light beam of an image.

The projection type image display apparatuses such as the above have the following drawbacks.

As described above, these image display apparatuses use a PBS having a square pole shape as a polarization selective reflection element having a function of reflecting or transmitting light in accordance with the polarization direction thereof.

Such a PBS is made by depositing a dielectric multi-layer film on a surface of one of two glass prisms made of optical glass (e.g., BK7), and attaching the two prisms together so that the deposited surface constitutes an interface therebetween. For example, the glass prism is made by the following procedure: a large glass block is made by cooling glass which has been melted at a high temperature; a small glass block is scraped from the large glass block; and a surface of the small glass block is polished. When cooling and solidifying the glass, an annealing process is adopted in order to remove any deformations. However, it is difficult to remove the deformations completely. Furthermore, such deformations generally occur unevenly in the prism. These deformations cause birefringence in the light in the prism. Since the deformations are not uniform, the degree of birefringence and the direction of the principal axis of birefringence exhibit an uneven distribution.

In the case where a light beam is incident upon a uniaxial birefringent material, there arises a difference in the travelling speed between ordinary ray and extraordinary ray. This causes, for example, a phase contrast between the ordinary ray and the extraordinary ray in the case where a linearly polarized light beam which is diagonal to the principal axis of birefringence. Such a phase contrast adversely affects the polarization state of the incident light beam.

Problems found in the case where birefringence remains in the PBS will now be described, using the projection type image display apparatus disclosed in Japanese Laid-Open Publication No. 63-39294 as an example (see FIG. 1).

Ideally, the light beam emitted by the light source 12 is incident upon the PBS 14 and is separated by the plane of the dielectric multi-layer film into two linearly polarized light beams whose polarization directions are orthogonal to each other. Only the component of the light beam which had the polarization direction thereof rotated by the liquid crystal display panels 16, 17 and 18 in response to image information and is now orthogonal to the polarization direction of the incident light, passes through the PBS 14, and is enlarged and projected on the screen 7 by the projection lens 6.

However, in the case where birefringence remains in the prism constituting the PBS 14, while a linearly polarized light beam travels through the prism, a light beam orthogonal to the polarization direction of the incident light arises due to the birefringence. Accordingly, the component of the light beam which did not have the polarization direction thereof modulated by the liquid crystal display panels 16, 17 and 18 reaches the screen 7. In other words, light leaks even in the black display state and the contrast ratio of an image projected on the screen 7 is reduced. The above phenomenon also reduces the luminance of the image. Moreover, the unevenness of the deformations in the prism causes a noticeable problem of performance such as an occurrence of irregularity in the luminance in the image on the screen 7.

Next, problems found in the case where a PBS having a polarization separation function by means of a dielectric multi-layer film is used for a projection type image display apparatus are described with reference to FIG. 3.

The PBS including the dielectric multi-layer film has characteristics of transmitting a light beam of the polarization direction which is parallel to an incident plane (i.e., plane including the incident light and the reflected light) (i.e., P polarized light beam), and reflecting a light beam of the polarization direction which is orthogonal to the incident plane (i.e., S polarized light beam). Accordingly, different incident directions result in different polarization directions of the transmitted light beam (i.e., P polarized light beam) and the reflected light beam (i.e., S polarized light beam).

Generally, in projection type image display apparatuses, an illuminant light beam is not a perfectly collimated light beam, but a light beam having some spreading angle. When such an illuminant light beam is incident upon the PBS, the incident direction with respect to the plane of the dielectric multi-layer film varies in accordance with the spreading angle of the light beam. Accordingly, neither the light beam which passes through the PBS nor the light beam which is reflected by the PBS is completely linearly polarized to have one polarization direction. As a result, the contrast ratio is reduced in such an apparatus as disclosed in the Japanese Laid-Open Publication No. 63-39294, etc., which uses birefringence of liquid crystal molecules. Furthermore, the PBS does not allow the polarization directions of the reflected light beam and the transmitted light beam to be set at an arbitrary angle. Consequently, when the PBS is used with a display element for which the polarization direction of an incident light beam must be fixed to a predetermined direction (e.g., liquid crystal display panel), it may be necessary to change the polarization direction of the light beam from the PBS using a wave plate, and the like.

The above problems also arise in such a projection type image display apparatus as disclosed in Japanese Laid-Open Publication No. 8-160374, which uses a transmissive image display element.

Moreover, a PBS having a size of about several tens of millimeters is normally required in accordance with the size of the liquid crystal display panel. This requirement makes the production of the PBS from a glass prism expensive, which leads to an increase in the costs and the weight of the apparatus.

SUMMARY OF THE INVENTION

According to one aspect of the invention, a projection type image display apparatus includes: a light source; a polarization selective reflection element having a function of reflecting or transmitting a light beam from the light source in accordance with a polarization direction thereof; and an element for modulating a polarization plane of an incident light beam in accordance with an image to be displayed. The polarization selective reflection element is film-like and has an optical transmission axis and an optical reflection axis. The polarization selective reflection element transmits a first linearly polarized light beam, and reflects a second linearly polarized light beam having a polarization plane orthogonal to a polarization plane of the first linearly polarized light beam, regardless of a direction of incidence of a light beam with respect to the polarization selective reflection element.

In one embodiment of the invention, the projection type image display apparatus further includes a polarizing filter for transmitting only a linearly polarized component of a light beam having one direction in at least one of a portion between the light source and the polarization selective reflection element, and a portion between the polarization selective reflection element and a projection lens.

In another embodiment of the invention, the polarization selective reflection element has a structure in which a polarization selective reflection film having a polarization selective reflection function is stacked on a polarizing filter for transmitting only a linearly polarized component of a light beam having one direction, the polarization selective reflection film being closer to the reflective image display element.

In yet another embodiment of the invention, the projection type image display apparatus further includes: a color separating element for separating a light beam from the light source into a plurality of light beams each having a different wavelength region; a plurality of polarization selective reflection elements having a function of reflecting or transmitting a light beam from the light source in accordance with a polarization direction thereof; a plurality of elements for modulating a polarization plane of an incident light beam in accordance with an image to be displayed; and a color synthesizing element for synthesizing the plurality of light beams each having a different wavelength region. The plurality of polarization selective reflection elements and the plurality of reflective image display elements respectively correspond to the plurality of light beams each having a different wavelength region. The color separating element is provided in an optical path between the plurality of polarization selective reflection elements and the light source. The color synthesizing element is provided in an optical path between the plurality of polarization selective reflection elements and a projection lens.

According to one aspect of the invention, a projection type image display apparatus includes: a light source; a color separating device for separating a light beam from the light source into three primary color light beams of red, blue and green; a polarization selective reflection element for respectively reflecting or transmitting the red, blue and green light beams separated by the color separating device in accordance with a polarization direction of the red, blue and green light beams; three reflective image display elements for respectively receiving the red, blue and green light beams from the polarization selective reflection element, and modulating a polarization plane thereof in response to an image signal; a color synthesizing element for synthesizing light beams reflected by the three reflective image display elements; and a projection lens for projecting a light beam synthesized by the color synthesizing element. The color separating device includes a first color separating element in which a first reflection plane for selectively reflecting, in a first direction, a first luminous flux including light beams of any two colors of the three primary colors of red, blue and green from an incident luminous flux from the light source, and a second reflection plane for reflecting a second luminous flux including a light beam of the remaining one color in a second direction which is substantially opposite to the first direction, are crossed, and a second color separating element for reflecting one of the light beams of any two colors included in the first luminous flux. Optical paths between the light source and each of the three of reflective image display elements have substantially the same length.

In one embodiment of the invention, one of the light beams of any two colors included in the first luminous flux is green, and the second color separating element reflects a green light beam.

Functions of the present invention will be described below.

A projection type image display apparatus according to the present invention employs a film-like polarization selective reflection element. Accordingly, the amount of glass having birefringence used in the optical path between the polarization selective reflection element and an image display element can be greatly reduced. As a result, a decrease in the contrast ratio and the illuminance on the screen due to birefringence of glass can be reduced. Furthermore, since a large-sized glass prism is not used, the apparatus can be produced at a low cost, and a reduction in weight of the apparatus can be achieved.

According to the present invention, the polarization selective reflection element has, inside the plane thereof, a transmission axis which transmits a particular linearly polarized light beam, and a reflection axis which reflects a linearly polarized light beam orthogonal to the above particular linearly polarized light beam. Accordingly, the transmitted light beam and the reflected light beam each become a linearly polarized light beam having one polarization direction even if an illuminant light beam has a spreading angle. As a result, the contrast ratio can be improved. Furthermore, it is possible to allow a light beam having a polarization direction of any angle to be transmitted or reflected by adjusting the transmission and reflection axes. Consequently, even in the case where the polarization direction of a light beam to be incident upon a liquid crystal display panel is inclined with respect to the P polarization or the S polarization, there is no need to change the polarization of the light beam by means of a wave plate. This is cost-saving and can prevent an optical loss which occurs while the light beam passes through the wave plate.

In the case where a polarizing filter is provided between a light source and the polarization selective reflection element, it is possible to limit the polarization direction of a light beam incident upon the polarization selective reflection element to one direction. This makes it possible to guide only a light beam having one polarization direction to the image display element regardless of the polarization characteristics (i.e., extinction ratio) of the polarization selective reflection element. In the case where the polarizing filter is provided between the polarization selective reflection element and a projection lens, it is possible to guide only a light beam having one polarization direction to a screen regardless of the polarization characteristics (i.e., extinction ratio) of the polarization selective reflection element. As a result, an apparatus having a higher contrast ratio can be realized.

In the case where a polarizing filter is provided between the polarization selective reflection element and the projection lens, stacking the polarizing filter and the polarization selective reflection element and placing the stacked element so that the polarization selective reflection element faces the image display element makes it possible to realize an apparatus exhibiting a higher contrast ratio. This is due to the absence of element having birefringence in the optical path between the polarization selective reflection element and the polarizing filter.

Placement of a color separating element in an optical path between the polarization selective reflection element and the light source, and of a color synthesizing element in an optical path between the polarization selective reflection element and the projection lens, eliminates the need for providing an element which performs color separation or synthesis in an optical path between the polarization selective reflection element and the image display element. As a result, a decrease in the contrast ratio and an occurrence of an irregularity in luminance can be curbed even if birefringence exists in the optical components used as the color separating and synthesizing elements.

The color separating device of the projection type image display apparatus according to the present invention includes a first color separating element in which a first reflection plane for selectively reflecting, in a first direction, a first luminous flux including light beams of any two colors of the three primary colors of red, blue and green from an incident luminous flux from the light source, and a second reflection plane for reflecting a second luminous flux including a light beam of the remaining one color in a second direction which is substantially opposite to the first direction, are crossed, and a second color separating element for reflecting one of the light beams of the two colors included in the first luminous flux. Additionally, in the apparatus according to the present invention, optical paths between the light source and each of the three reflective image display elements have substantially the same length. As a result, a bright, satisfactory image with no shift in the white balance due to the difference in the length of the optical paths can be realized. Furthermore, since a relay lens for transferring a light beam which was conventionally necessary to present a shift in the white balance is not required, the manufacturing costs can be reduced.

Moreover, setting one of the light beams of the two colors included in the first luminous flux which is incident upon the color separating device to be green, and setting the second color separating element to reflect a green light beam, allow a film which continuously reflects a light beam on the longer or shorter wavelength side of the wavelength region of the green light beam to be stacked on a reflection plane of the color separating device. This makes it possible to produce an image display apparatus having excellent characteristics less expensively.

Thus, the invention described herein makes possible the advantage of providing a projection type image display apparatus having an optical system which performs polarization separation and synthesis of light from a light source which is produced at a low cost, is of a light weight, prevents a decrease in the screen illuminance and in the contrast ratio due to birefringence, and controls the occurrence of irregularity in the luminance.

These and other advantages of the present invention will become apparent to those skilled in the art upon reading and understanding the following detailed description with reference to the accompanying figures.

DESCRIPTION OF THE PREFERRED EMBODIMENTS

Figure 1:
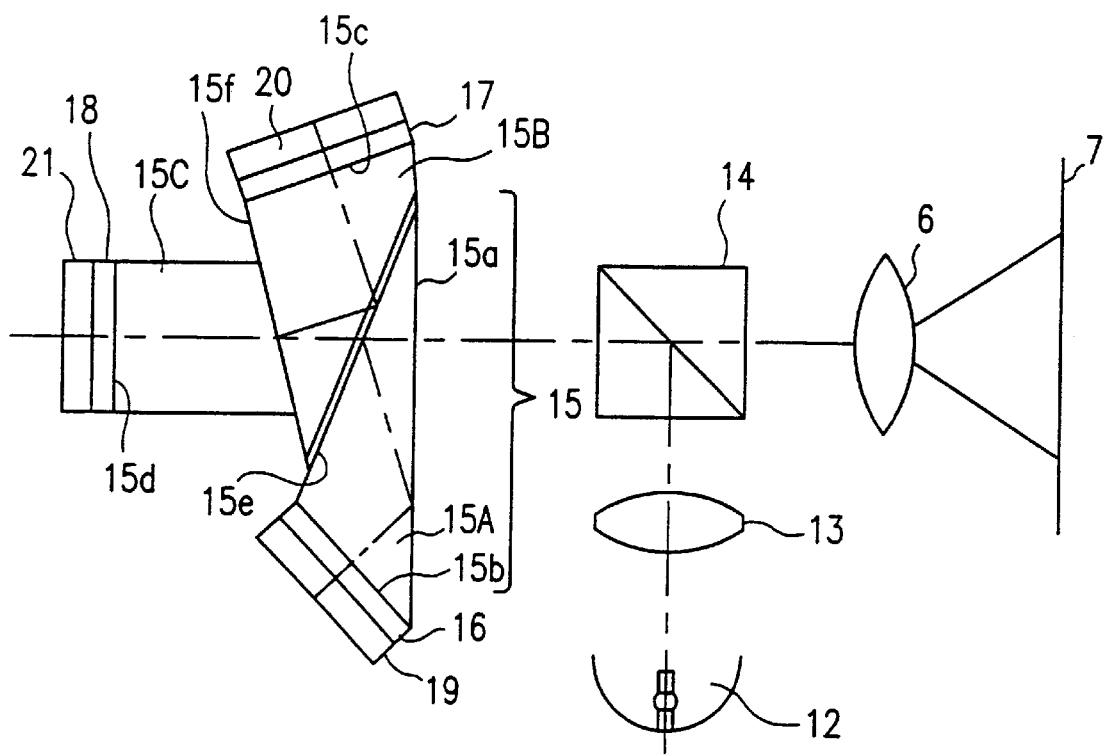
FIG. 1 is a schematic view of a conventional reflective image display apparatus.
Figure 2:
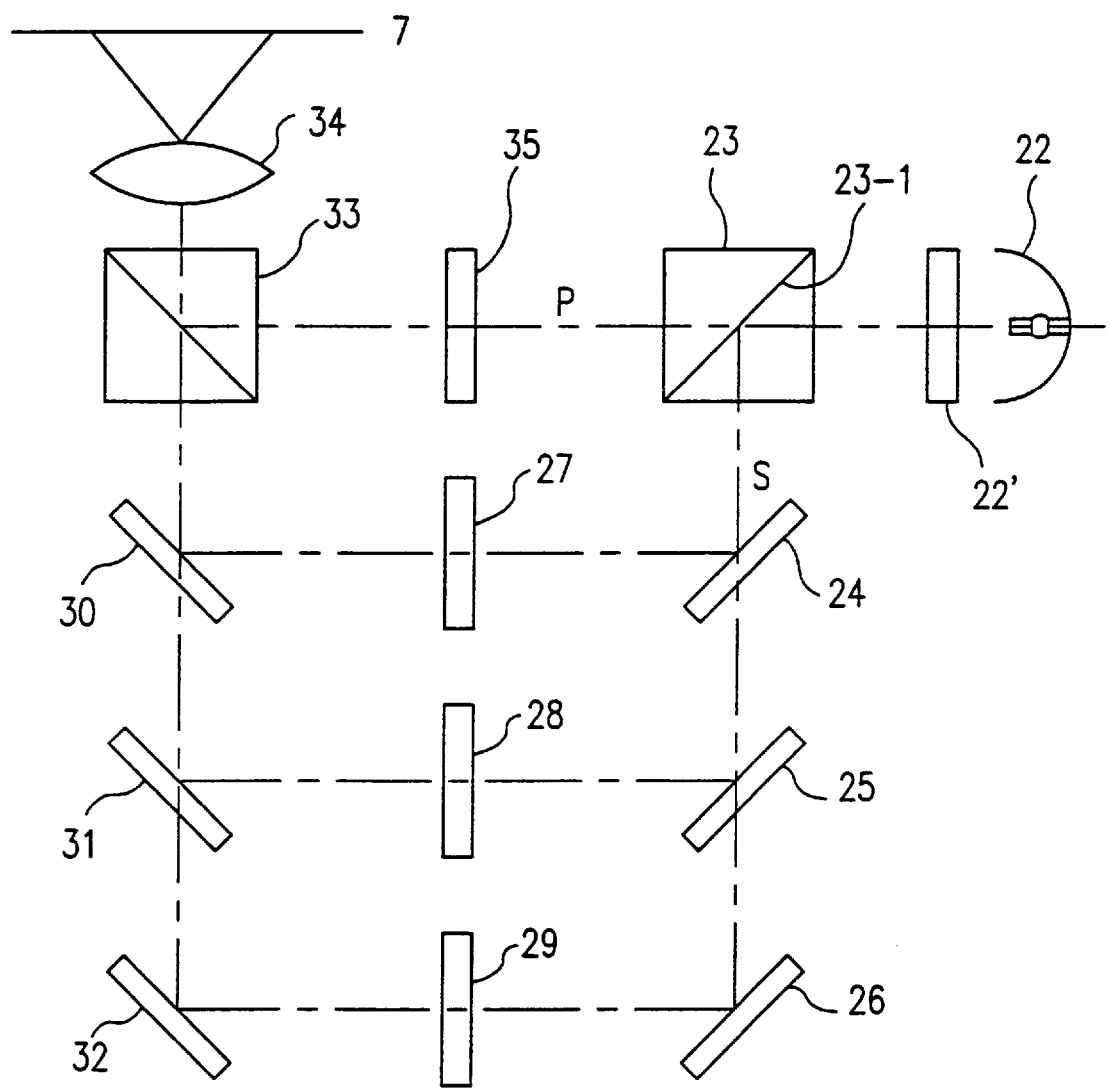
FIG. 2 is a schematic view of another conventional reflective image display apparatus.
Figure 3:
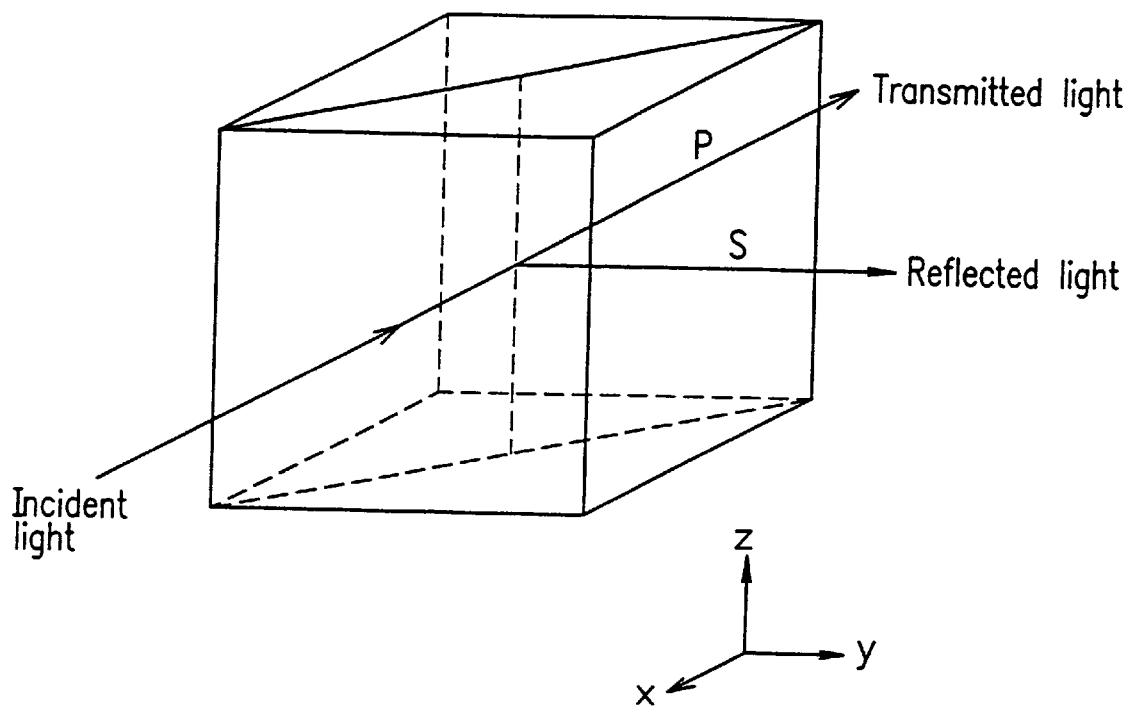
FIG. 3 is a perspective view of a PBS illustrating principles thereof.

The present invention will be described below by way of illustrative examples with reference to the accompanying drawings. Like reference numerals refer to like parts throughout the following description.

EXAMPLE 1

Figure 4A:
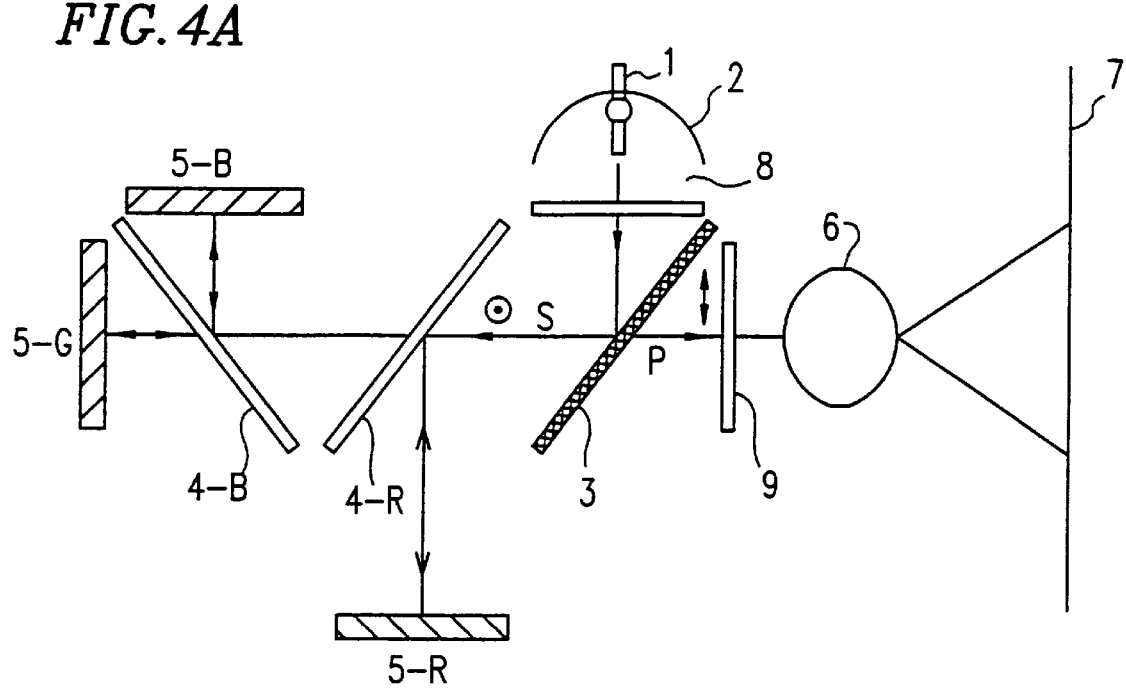
FIG. 4A is a schematic view of a projection type image display apparatus according to Example 1 of the present invention.

FIGS. 4A is a schematic view of a projection type color image display apparatus according to Example 1 of the present invention. In Example 1, a metal halide lamp of 250 W having an arc length of 3 mm is used as a light source 1. A halogen lamp or a xenon lamp can also be used as the light source 1. On the back of the light source 1, a parabolic mirror 2 for outputting a light beam from the light source 1 as a substantially collimated light beam is provided. In the forward direction of the light source 1, a polarization selective reflection element is provided. As the polarization selective reflection element, a polarization selective reflection film 3 having an optical transmission axis which transmits a linearly polarized light beam of one direction, and an optical reflection axis which reflects a light beam orthogonal to the above linearly polarized light beam of one direction regardless of the direction of light incidence, is used.

Figure 5:
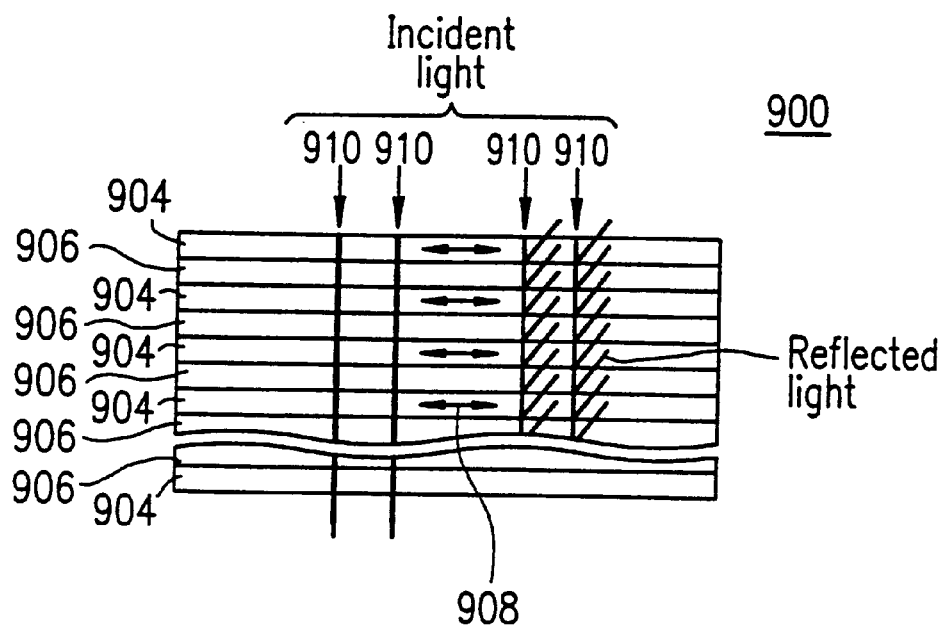
FIG. 5 is a cross-sectional view of a polarization selective reflection film illustrating a structure thereof.

As the polarization selective reflection film 3 a film such as film 900 which is disclosed in Japanese Laid-Open Publication No. 57-158801 and shown in FIG. 5 can be used. In the film 900, a material having birefringence 904 and an isotropic material 906 are stacked alternately, and the refractive index of the isotropic material 906 and the refractive index of the direction of one of the optical axes 908 of the birefringent material 904 are substantially the same. The film 900 is a polarizer which transmits a component of an incident light beam 910 having a polarization plane of the direction of the above-mentioned one of the optical axes, and reflects a component of the incident light beam 910 orthogonal thereto. Optical Film D-BEF manufactured by 3M Co. having a function similar to that of the film 900 can also be used.

Figure 6:
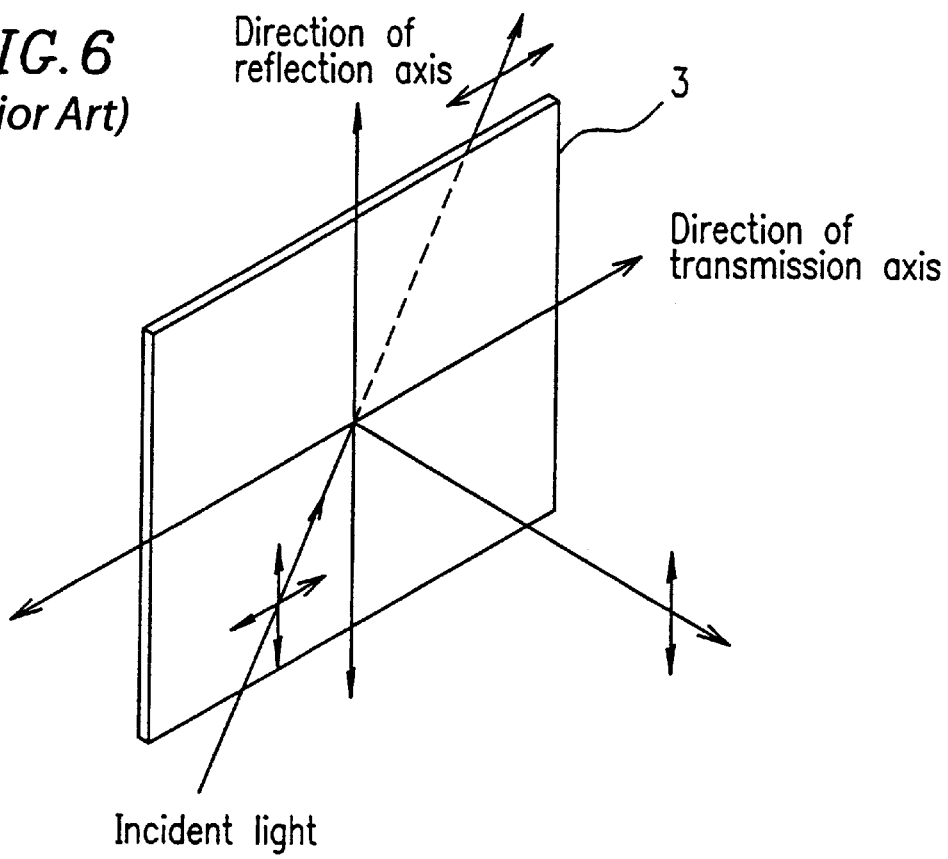
FIG. 6 is a perspective view illustrating a polarization selective reflection film according to the present invention.

As shown in FIG. 6, the polarization selective reflection film 3 has a transmission axis and a reflection axis therein. Accordingly, the transmitted light beam and the reflected light beam become a linearly polarized light beam which is parallel to the transmission axis and the reflection axis respectively even if an illuminant light beam has a spreading angle. Furthermore, since the polarization selective reflection film 3 is like a film having a very small thickness, there is no effect produced by birefringence. Consequently, the contrast ratio is improved compared to, for example, the case where a PBS in which the polarization direction of reflected and transmitted light beams varies in accordance with the direction of light incidence (i.e., spreading angle), is used.

The polarization selective reflection film 3 separates a light beam into a P polarized light beam and an S polarized light beam. In the structure shown in FIG. 4A, the S polarized light beam reflected by the polarization selective reflection film 3 is incident upon dichroic mirrors 4-R and 4-B, and is then separated into red, green and blue (henceforth referred to simply as "R", "G" and "B" respectively) light beams. Thereafter, these light beams are respectively incident upon corresponding reflective liquid crystal display panels 5-R, 5G and 5-B. Then, the incident light beams have the polarization state thereof modulated in response to an image signal, and are reflected.

The light beams reflected by the reflective liquid crystal display panels 5-R, 5-G and 5-B are synthesized by the dichroic mirrors 4-R and 4-B. Only the light beams which had the polarization thereof rotated by the reflective liquid crystal display panels 5-R, 5-G and 5-B and became P polarized light beams are transmitted through the polarization selective reflection film 3, pass through a projection lens 6, and are projected on a screen 7. The S polarized light beam is reflected by the polarization selective reflection film 3 and returns to the light source 1.

Figure 4B:
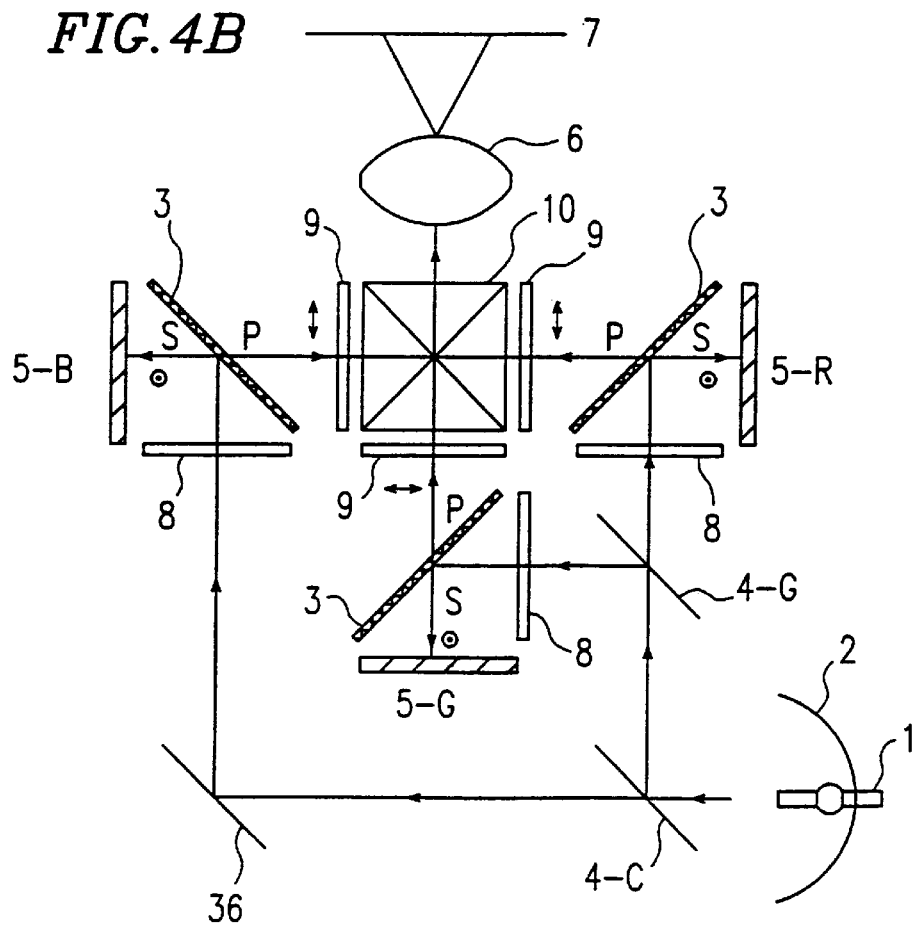
FIG. 4B is a schematic view of a modification of the projection type image display apparatus according to Example 1 of the present invention.

FIG. 4B is a schematic view of a modification of the projection type image display apparatus according to Example 1 of the present invention. In the structure shown in FIG. 4B, a light beam from the light source 1 is incident upon a dichroic mirror 4-C and the dichroic mirror 4-G, and is separated into R, G and B light beams. Thereafter, these light beams respectively pass through the corresponding polarization selective reflection film 3, and are incident upon the corresponding one of the reflective liquid crystal display panels 5-R, 5-G and 5-B. Then, the incident light beams have the polarization state thereof modulated in response to an image signal, and are reflected. The light beams reflected by the reflective liquid crystal display panels 5-R, 5-G and 5-B are each incident upon the corresponding polarization selective reflection film 3 again. Only the components of the incident light beams which had the polarization direction thereof rotated by the reflective liquid crystal display panels 5-R, 5-G and 5-B and thus became P polarized light beams pass through the polarization selective reflection film 3, are synthesized by a cross dichroic prism 10, and then projected on the screen 7 by the projection lens 6.

In Example 1, a 1.3 type S-VGA (pixel pitch: 33 μm×33 μm) which employs an electrically controlled birefringence mode for displaying an image by controlling the polarization direction of an incident light beam using birefringence of liquid crystal molecules, is used as the reflective liquid crystal display panels 5-R, 5-G and 5-B.

In Example 1, a polarizing filter 8 is provided between the light source 1 and the polarization selective reflection film 3, and another polarizing filter 9 is provided between the polarization selective reflection film 3 and the projection lens 6. The polarizing filters 8 and 9 are placed in such a manner that the transmission axes thereof are in a crossed Nicols state with respect to the optical path.

In the apparatuses shown in FIGS. 4A and 4B, the transmission axis of the polarizing filter 8 on the light source 1 side is arranged to be perpendicular to the sheet of FIGS. 4A and 4B. By arranging the polarizing filter 8 between the light source 1 and the polarization selective reflection film 3, and the polarizing filter 9 between the polarization selective reflection film 3 and the projection lens 6 in the crossed Nicols state like this, the light beam incident upon the polarization selective reflection film 3 becomes an S polarized light beam, and even if the polarization separation ratio (i.e., extinction ratio) of the polarization selective reflection film 3 is low, most of the light beam incident upon the reflective liquid crystal display panels 5-R, 5-G and 5-B becomes an S polarized light beam. Furthermore, the light beam which is reflected by the reflective liquid crystal display panels 5-R, 5-G and 5-B and remains as the S polarized light beam, is reflected by the polarization selective reflection film 3 again. Most of the reflected light beam returns to the light source 1. A portion of the S polarized light beam is transmitted through the polarization selective reflection film 3. If the transmitted light beam were projected on the screen 7 by the projection lens 6, the contrast ratio would be reduced; however, since the polarizing axis of the polarizing filter 9 inserted between the polarization selective reflection film 3 and the projection lens 6 is set to cut the S polarized light beam, a decrease in the contrast ratio can be curbed to a great extent. In Example 1, polarizing filters are provided on the both sides of the polarization selective reflection film 3, but the same effect can be achieved by providing a polarizing filter only on one side.

In the apparatuses shown in FIGS. 4A and 4B, the polarization direction of the light beam incident upon the reflective liquid crystal display panels 5-R, 5-G and 5-B is set to be perpendicular to the sheet of FIGS. 4A and 4B. Thus, the polarization selective reflection film 3 is arranged in such a manner that the reflection axis (see FIG. 6) is also perpendicular to the sheet of FIGS. 4A and 4B.

In Example 1, the reflection axis of the polarization selective reflection film 3 is set to be perpendicular to the sheet of FIGS. 4A and 4B, but the direction of the reflection axis is not limited thereto. The direction of the reflection axis can be any direction, for example, horizontal to or at a 45° angle with respect to the sheet of FIGS. 4A and 4B, in accordance to the characteristics of the reflective liquid crystal display panels 5-R, 5-G and 5-B.

Figure 8A:
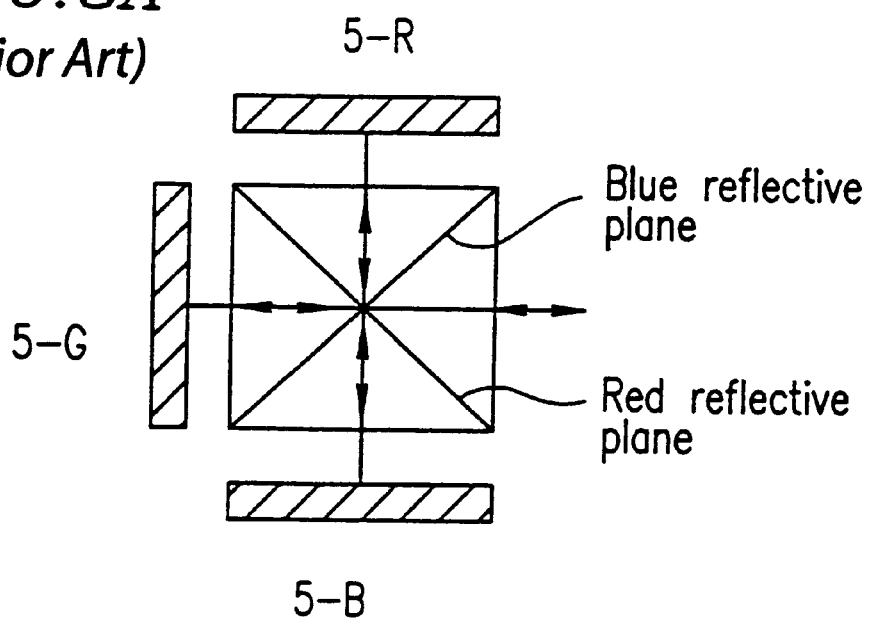
FIG. 8A is a diagram illustrating a system of color separation and synthesis which can be used as an alternative to a system of color separation and synthesis according to the present invention.
Figure 8B:
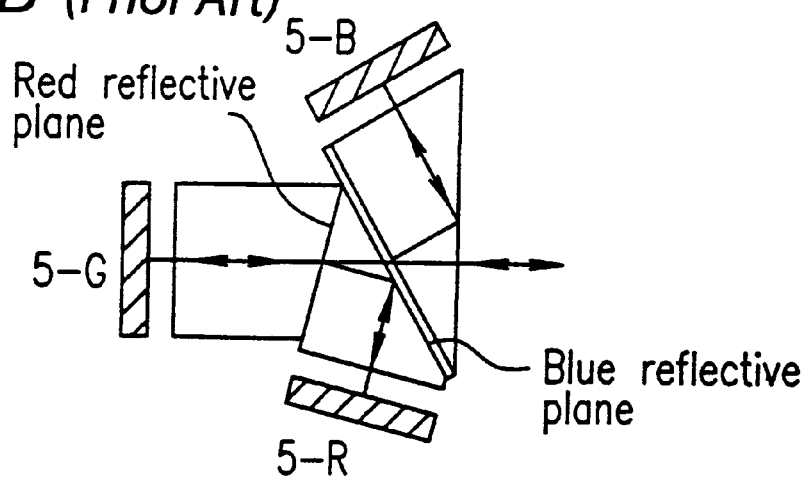
FIG. 8B is a diagram illustrating another system of color separation and synthesis which can be used as an alternative to a system of color separation and synthesis according to the present invention.

In the structure shown in FIG. 4A, the dichroic mirrors 4-R and 4-B which are reflective to R and B respectively, are used as color separating and synthesizing elements. In the structure shown in FIG. 4B, the dichroic mirror 4-C which is reflective to R and G, and the dichroic mirror 4-G which is reflective to G, are used as color separating elements, and the cross dichroic prism 10 is used as a color synthesizing element. However, any element can be used as long as the element has the function of color separation and synthesis. For example, a cross dichroic prism shown in FIG. 8A or a so-called Philips type prism including three prisms shown in FIG. 8B can be used.

In this case, however, birefringence in such prisms reduces the contrast ratio as described above. Therefore, such prisms as disclosed in Japanese Laid-Open Publication No. 5-341254 and Japanese Laid-Open Publication No. 8-211357, which have the inside thereof filled with a liquid, thereby reducing birefringence, are preferably used.

In Example 1, the polarization selective reflection film 3 is used as a polarization selective reflection element. However, any element can be used as long as the element produces the same effect. For example, such a combination of a cholesteric polarizer and a quarter-wave plate as disclosed in Japanese Laid-Open Publication No. 6-281814 can be used. According to Japanese Laid-Open Publication No. 6-281814, the cholesteric polarizer has an optical active layer made of a cholesteric (chiral nematic) material. The cholesteric polarizer reflects a circularly polarized light beam which matches the direction and the pitch of the spiral structure of chiral molecules, and transmits the remaining light beam. The circularly polarized light beam which was transmitted or reflected can be linearly polarized by the quarter-wave plate.

When a projection type image display apparatus is arranged using the structure shown in FIG. 4A, a contrast ratio of 200:1 or better can be realized over the entire screen 7 while maintaining sufficient luminance. Similarly, with a structure shown in FIG. 4B, a contrast ratio of 300:1 or better can be realized.

In Example 1, the contrast ratio is determined by the optical path length between the polarizing filter 8 and the polarizing filter 9 which are provided at the front and the back of the polarization selective reflection film 3 respectively.

In order to increase the strength of the film-like polarization selective reflection element using the above-described polarization selective reflection film 3, the cholesteric polarizer, and the like, the polarization selective reflection element may be attached to a transparent substrate such as a glass substrate. In this case, by providing the polarization selective reflection element on the side of the reflective liquid crystal display panels 5-R, 5-G and 5-B, the distance which light travels through the transparent substrate can be made shorter (i.e., shorter by a thickness of one transparent substrate). Accordingly, the effect of birefringence can be reduced.

Figure 7:
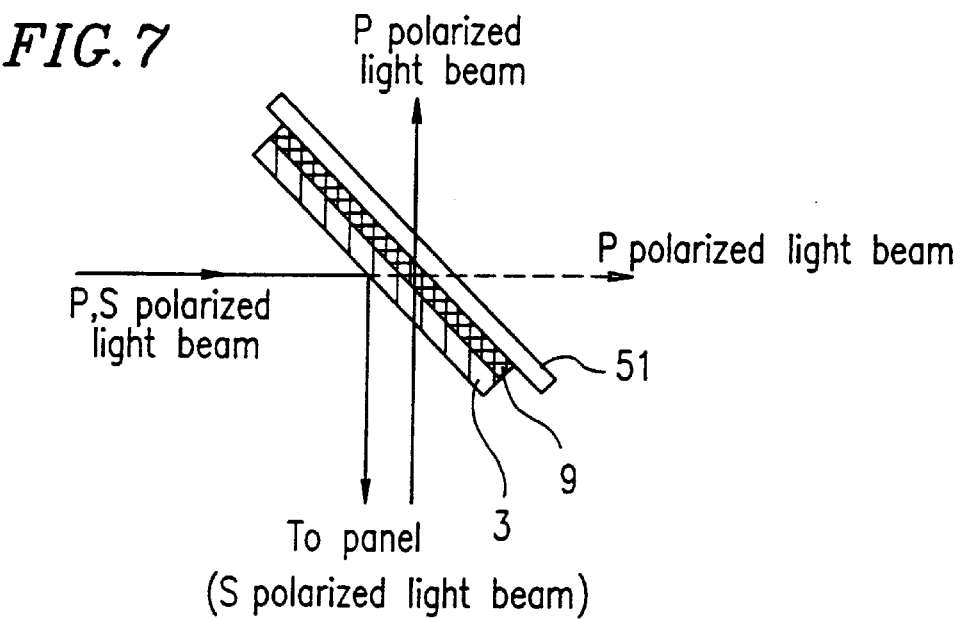
FIG. 7 is a cross-sectional view illustrating a sheet-like polarization selective reflection element according to the present invention.

An exemplary sheet-like polarization selective reflection element is shown in FIG. 7. In this specification, "film-like" refers to a state in which an element is not capable of retaining the structure or the shape thereof by itself. In contrast, "sheet-like" refers to a state in which an element is capable of retaining the structure or the shape thereof by itself. A sheet-like polarization selective reflection element refers to, for example, the polarization selective reflection film 3 attached to a glass substrate 51. In this exemplary sheet-like polarization selective reflection element, the polarizing filter 9 is provided between the polarization selective reflection film 3 and the glass substrate 51. This allows a light beam to pass through the transparent substrate after passing through the polarizing filter 9. Accordingly, the effect produced by birefringence of the transparent substrate can be completely prevented, and the contrast ratio can be further improved.

As described above, the projection type image display apparatus according to Example 1 is provided with a polarization selective reflection element having an optical transmission axis which transmits a linearly polarized light beam of one direction, and an optical reflection axis which reflects a light beam orthogonal to the above linearly polarized light beam of one direction regardless of the angle of incidence. Accordingly, even if an illuminant light beam has a spreading angle, the transmitted light beam and the reflected light beam become linearly polarized light beams which are parallel to the transmission axis and the reflection axis respectively. This makes it possible to further improve the contrast ratio.

Since the direction of the transmission axis and the reflection axis of the polarization selective reflection film 3 can be arbitrarily set, the direction of the polarization vector of the transmitted light beam and the reflected light beam can be controlled. This makes it possible to adjust the polarization direction of the incident light beam to a preferable polarization direction with respect to the reflective liquid crystal display panels 5-R, 5-G and 5-B without using an optical element such as a quarter-wave plate.

Moreover, by using a film-like polarization selective reflection element having a small degree of birefringence, irregularity in the contrast can be eliminated, which leads to a realization of a bright image.

Furthermore, the use of a sheet-like polarization selective reflection element having a polarizing filter between a polarization selective reflection film and a glass substrate makes it possible to completely prevent the effect produced by birefringence of the glass substrate, and to further improve the contrast ratio.

EXAMPLE 2

Figure 9:
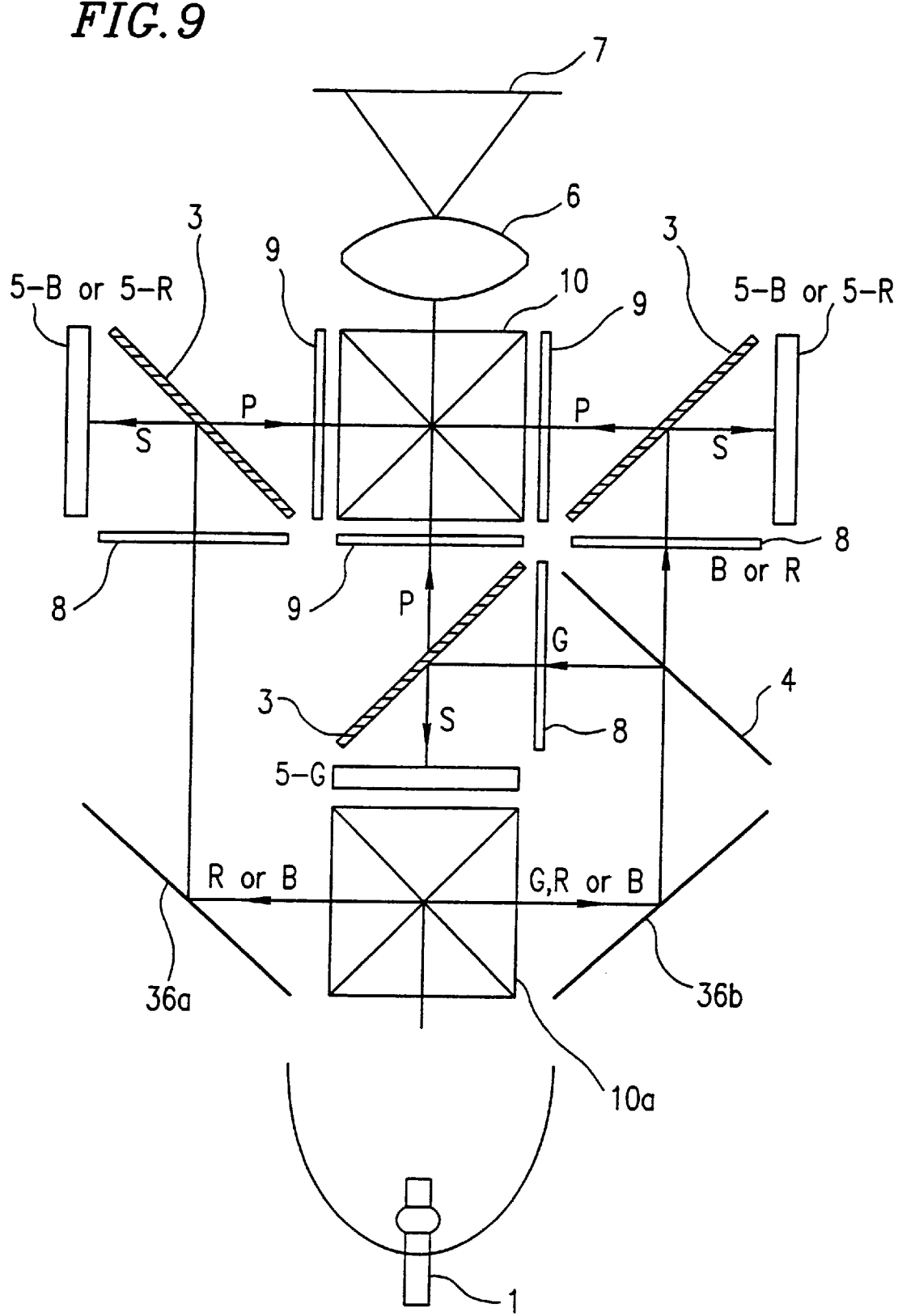
FIG. 9 is a schematic view of a projection type image display apparatus according to Example 2 of the present invention.

FIG. 9 is a schematic view of a projection type color image display apparatus according to Example 2 of the present invention. In Example 2, three optical paths from a light source 1 to reflective liquid crystal display panels 5-R, 5-G and 5-B through which R, G and B light beams travel respectively, have substantially the same length (in air equivalent).

In the structure shown in FIG. 4B, the optical path through which the B light beam travels is longer than the other two optical paths through which the R and G light beams travel. As a result, a loss in the B light beam is greater than losses in the R and G light beams, which leads to a shift in the white balance in the case where the R, G and B light beams are synthesized by a cross dichroic prism 10 without correcting the above-mentioned difference in the losses. In order to reduce the optical loss due to the difference in the length of the optical paths, a method of transferring a light beam to a reflective liquid crystal display panel plane by a relay lens has been employed. However, due to aberration, surface reflection, etc. of the relay lens, this method cannot completely eliminate the optical loss. Furthermore, the use of the relay lens increases the cost.

Figure 10:
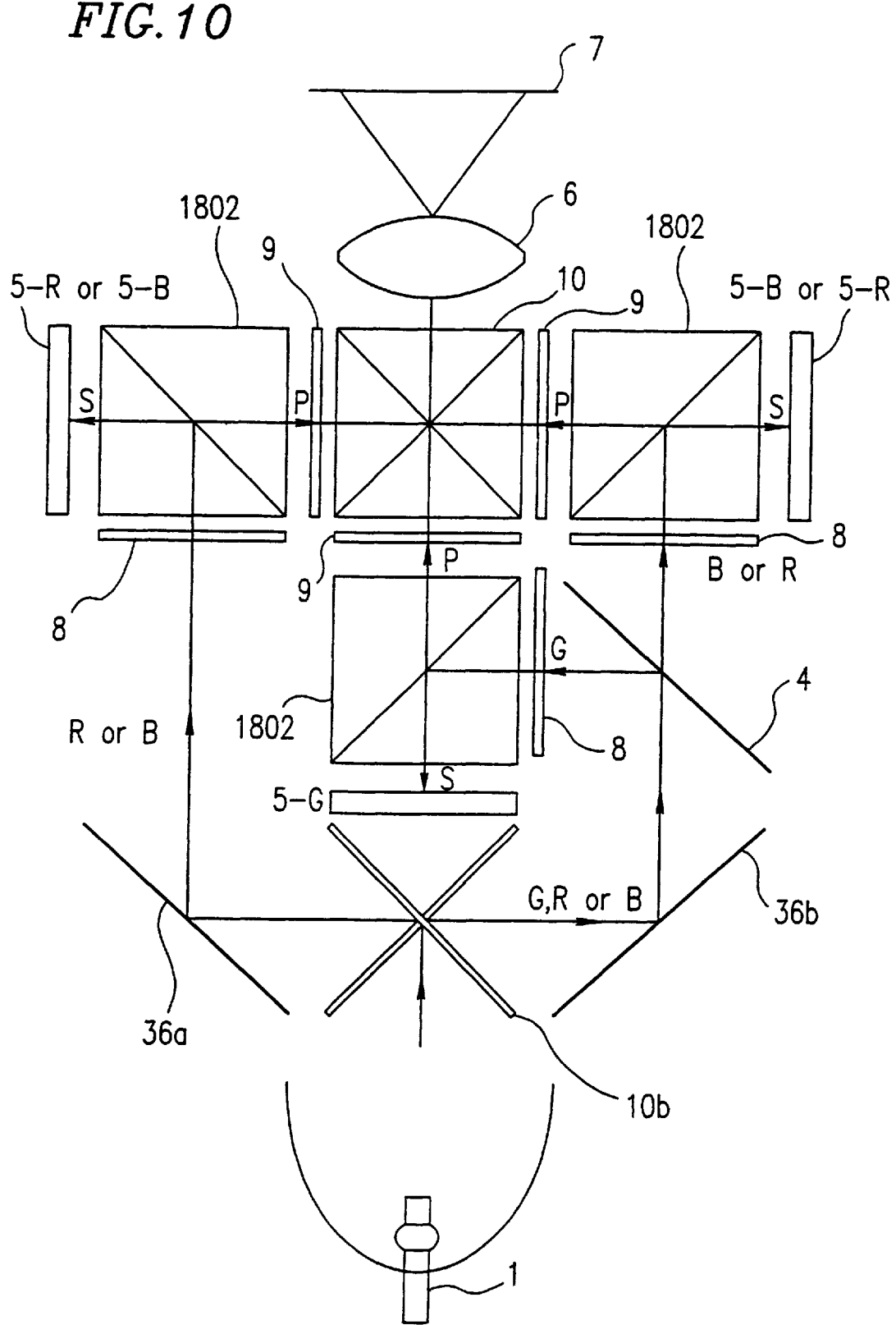
FIG. 10 is a schematic view of a modification of the projection type image display apparatus according to Example 2 of the present invention.

In contrast, in the apparatus shown in FIG. 9, the optical paths from the light source 1 to the reflective liquid crystal display panels 5-R, 5-G and 5-B through which R, G and B light beams travel respectively, have substantially the same length (in air equivalent). A cross dichroic prism 10a is used to separate a light beam emitted by the light source 1 into three primary color light beams. A cross dichroic mirror 10b such as shown in FIG. 10 can also be used instead of the cross dichroic prism 10a. The cross dichroic prism 10a separates a light beam into an R (or B) light beam and a light beam including G and B (or R) components. The R (or B) light beam is reflected by a total reflecting mirror 36a and is incident upon a corresponding polarization selective reflection film 3. The light beam including G and B (or R) components is reflected by a total reflecting mirror 36b and is incident upon a dichroic mirror 4. The dichroic mirror 4 separates this incident light beam into a G light beam and a B (or R) light beam.

Thereafter, the separated G light beam and B (or R) light beam are each incident upon the corresponding polarization selective reflection film 3. The linearly polarized component of the incident light beam whose polarization direction is parallel to the reflection axis of the polarization selective reflection film 3 is reflected, and is incident upon the corresponding one of reflective liquid crystal display panels 5-R, 5-G and 5-B.

The above structure allows the optical paths from the light source 1 to the reflective liquid crystal display panels 5-R, 5-G and 5-B to be of substantially the same length (in air equivalent). Consequently, the problem of the optical loss caused by the conventional apparatus can be eliminated, and an image with a good white balance can be realized. Furthermore, since no relay lens is necessary, lower manufacturing costs can be achieved.

In Example 2, the polarization selective reflection film 3 is provided for all of the reflective liquid crystal display panels 5-R, 5-G and 5-B. Each of the light beams reflected by the reflective liquid crystal display panels 5-R, 5-G and 5-B is incident upon the corresponding polarization selective reflection film 3 again. Only the components of the incident light beams which had the polarization direction thereof modulated by the reflective liquid crystal display panels 5-R, 5-G and 5-B are transmitted through the polarization selective reflection film 3. The transmitted light beams are synthesized by the cross dichroic prism 10, and then projected on a screen 7 by the projection lens 6.

Furthermore, in Example 2, a polarizing filter 8 is provided on the light source 1 side of the polarization selective reflection film 3. Moreover, another polarizing filter 9 is inserted between the polarization selective reflection film 3 and the cross dichroic prism 10. The polarizing filter 8 and the polarizing filter 9 produce the same effect as in Example 1.

When a projection type image display apparatus is arranged using the above structure, a contrast ratio of 300:1 or better can be realized over the entire screen 7 while maintaining a luminance of the same level as in Example 1, in spite of the use of a glass dichroic prism.

In Example 2, the cross dichroic prism 10a and the dichroic mirror 4 are used as a color separating device, and the polarization selective reflection film 3 is used as a polarization selective reflection element. The effect produced by the color separating device and that produced by the polarization selective reflection element are independent. For example, as shown in FIG. 10, the use of the cross dichroic mirror 10b and the dichroic mirror 4 having the characteristics described above as the color separating device, and the use of a cube-like, not film-like, PBS 1802 made of a glass block, or an immersion type PBS in which a plate having a polarization selective reflection plane is immersed in a liquid in order to prevent birefringence by the glass block, as the polarization selective reflection element can also prevent the above-described shift in the white balance.

Figure 11:
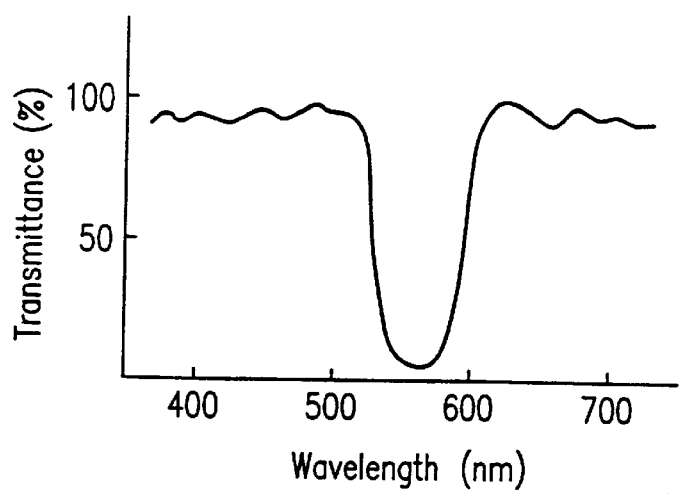
FIG. 11 is a graph illustrating an example of spectral characteristics of a dielectric mirror which reflects a green light beam.
Figure 12A:
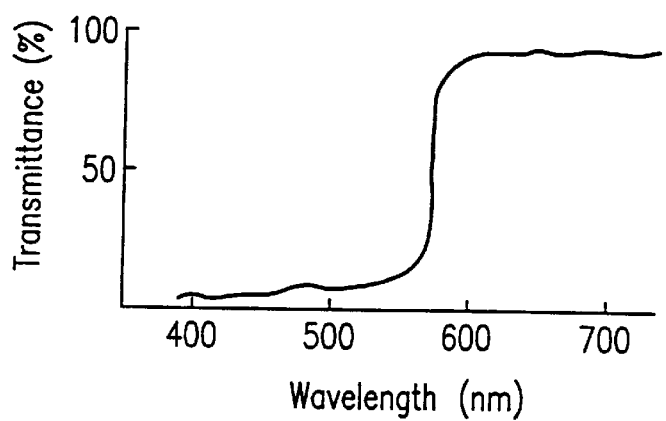
FIG. 12A is graph illustrating an example of spectral characteristics of a dielectric mirror which reflects a light beam in a shorter wavelength region.
Figure 12B:
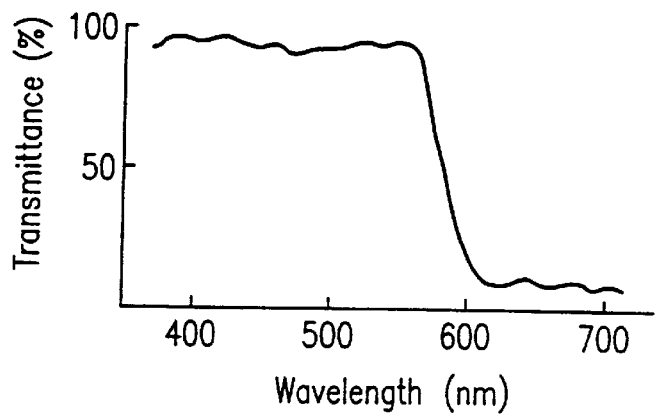
FIG. 12B is graph illustrating an example of spectral characteristics of a dielectric mirror which reflects a light beam in a longer wavelength region.

Normally, a dichroic mirror having the spectral characteristics shown in FIG. 11 which reflects only a G region light beam and transmits light beams which are on the shorter and longer wavelength sides of the G region (i.e., B and R light beams respectively), requires a complicated design of a film when compared to a dichroic mirror which continuously performs color separation by reflecting a light beam on the shorter wavelength side and transmitting a light beam on the longer wavelength side (see FIG. 12A) or a dichroic mirror which continuously performs color separation by transmitting a light beam on the shorter wavelength side and reflecting a light beam on the longer wavelength side (see FIG. 12B). This results in an increase in the manufacturing costs. In the cross dichroic prism 10a shown in FIG. 9 and the cross dichroic mirror 10b shown in FIG. 10, dielectric films are stacked on the reflection plane thereof. Accordingly, the cross dichroic prism 10a and the cross dichroic mirror 10b can be realized less expensively when a film exhibiting the characteristics shown in FIGS. 12A and 12B is used. Using such a film also improves the characteristics of the cross dichroic prism 10a and the cross dichroic mirror 10b.

In Example 2, one of the light beams separated by the cross dichroic prism 10a or the cross dichroic mirror 10b includes two color components having the same travelling direction, one of which is the G component. This makes it possible to use the cross dichroic prism 10a or the cross dichroic mirror 10b with a color separating plane having the characteristics of reflecting light continuously from the longer or shorter wavelength side. Consequently, an image display apparatus with excellent characteristics can be produced less expensively.

Furthermore, the dichroic mirror 4 reflects the G component of the two color components having the same travelling direction. This makes it possible to set the G component to be transmitted and the R and B components to be reflected by the cross dichroic prism 10 for color synthesis. Such a structure makes it unnecessary to provide the cross dichroic prism 10 with a plane which reflects the light beam in the G region shown in FIG. 11. Accordingly, the above-mentioned effect produced by the cross dichroic prism 10a or the cross dichroic mirror 10b can also be achieved by the cross dichroic prism 10.

Moreover, the R and B light beams whose wavelength regions are separate from each other are each reflected by a corresponding reflection plane of the cross dichroic prism 10. Accordingly, even if a light beam having a certain angle with respect to the optical axis is incident upon the reflection plane and the spectral reflection characteristic of each reflection plane shifts from a designed value, there is no overlap in the spectra of the light beams reflected by the reflection planes. Accordingly, the light beams from the reflective liquid crystal display panels 5-R and 5-B are each reflected by the corresponding reflection plane, most of which is incident upon the projection lens 6. As a result, a brighter image can be realized.

Figure 13:
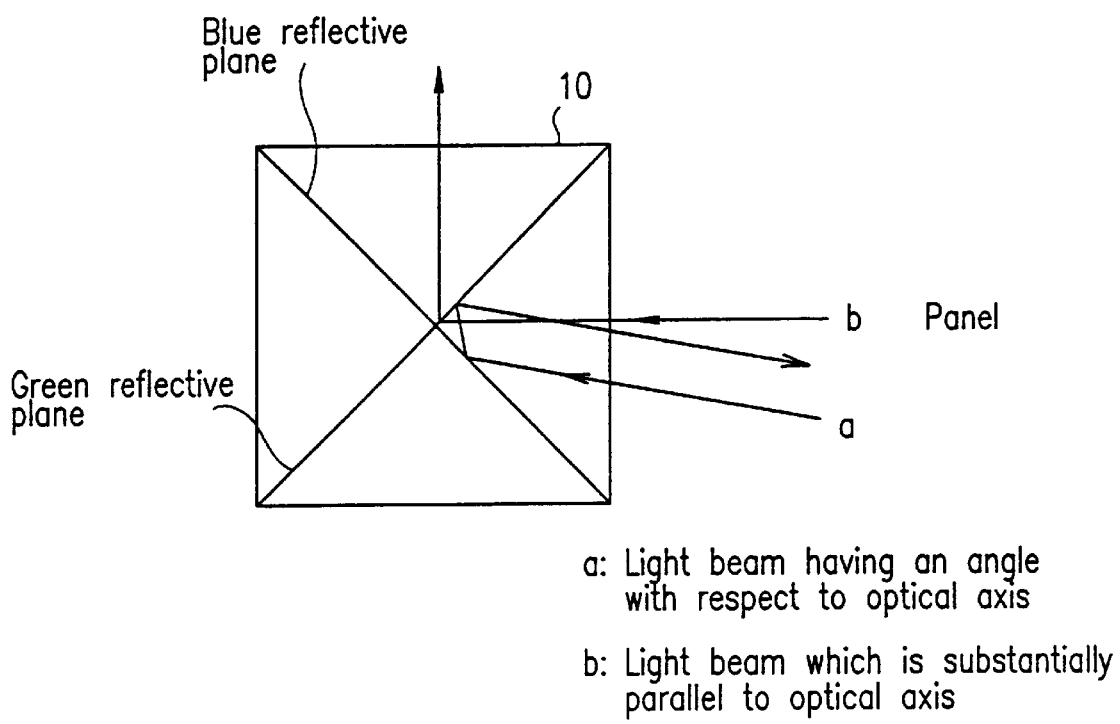
FIG. 13 is a diagram illustrating a problem of a cross dichroic mirror having a green reflection plane.

In contrast, when employing a structure in which the cross dichroic prism 10a or the cross dichroic mirror 10b for color separation, and the cross dichroic prism 10 for color synthesis reflect the G component, there will be an overlap in the reflection spectrum of the reflection plane corresponding to each component in the vicinity of the boundary between the R and G wavelength regions or between the B and G wavelength regions. As a result, a light beam whose wavelength is in the overlapping portion of the reflection spectrum is, for example, reflected by both of the reflection planes and does not reach the screen 7 like a luminous flux a shown in FIG. 13. This results in a decrease in the luminance.

According to Example 2, three optical paths from the light source 1 to the reflective liquid crystal display panels 5-R, 5-G and 5-B through which R, G and B light beams travel respectively, have substantially the same length (in air equivalent). Accordingly, there is no shift in the white balance due to the difference in the length of the optical paths found in the conventional projection type image display apparatus, and a bright, satisfactory image can be achieved. Moreover, since a relay lens for transferring a light beam which was conventionally necessary to prevent a shift in the white balance is not required, the manufacturing costs can be reduced.

Furthermore, according to Example 2, a multilayer film for continuously reflecting a light beam which is on the longer or shorter wavelength side of the wavelength region of the G light beam, is provided on the reflection planes of the cross dichroic prism 10a or the cross dichroic mirror 10b for color separation. This makes it possible to produce an image display apparatus having excellent characteristics less expensively.

Moreover, the use of the dichroic mirror 4 which reflects a light beam in the G wavelength region makes it possible to set the G light beam to be transmitted through the cross dichroic prism 10 for color synthesis, and the R and B light beams to be reflected by the cross dichroic prism 10. This eliminates the need for a G reflection plane to be provided in the cross dichroic prism 10, which also produces the effect of cost reduction as in the case with the cross dichroic prism 10a or the cross dichroic mirror 10b.

Additionally, the R and B light beams whose wavelength regions are separate from each other are each reflected by a corresponding reflection plane of the cross dichroic prism 10. Accordingly, even if a light beam having a certain angle with respect to the optical axis is incident upon the reflection plane and the spectral reflection characteristic of each reflection plane shifts from a designed value, there is no overlap in the spectra of the light beams reflected by the reflection planes. Accordingly, the light beams from the reflective liquid crystal display panels 5-R and 5-B are respectively reflected by the corresponding reflection plane, most of which is incident upon the projection lens 6. As a result, a brighter image can be realized.

Moreover, by performing color separation and synthesis in the optical path other than the portion between the polarization selective reflection element and the reflective liquid crystal display element, a reduction in the contrast ratio due to the optical system for color separation and synthesis can be avoided.

Furthermore, as in Example 1, the projection type image display apparatus according to Example 2 is provided with a polarization selective reflection element having an optical transmission axis which transmits a linearly polarized light beam of one direction, and an optical reflection axis which reflects a light beam orthogonal to the above linearly polarized light beam of one direction regardless of the angle of incidence.

Accordingly, even if an illuminant light beam has a spreading angle, the transmitted light beam and the reflected light beam become linearly polarized light beams which are parallel to the transmission axis and the reflection axis respectively. This makes it possible to further improve the contrast ratio.

Additionally, since the direction of the transmission axis and the reflection axis of the polarization selective reflection film 3 can be arbitrarily set, the direction of the polarization vector of the transmitted light beam and the reflected light beam can be controlled. This makes it possible to adjust the polarization direction of the incident light beam to a preferable polarization direction with respect to the reflective liquid crystal display panels 5-R, 5-G and 5-B without using an optical element such as a quarter-wave plate.

EXAMPLE 3

Figure 14:
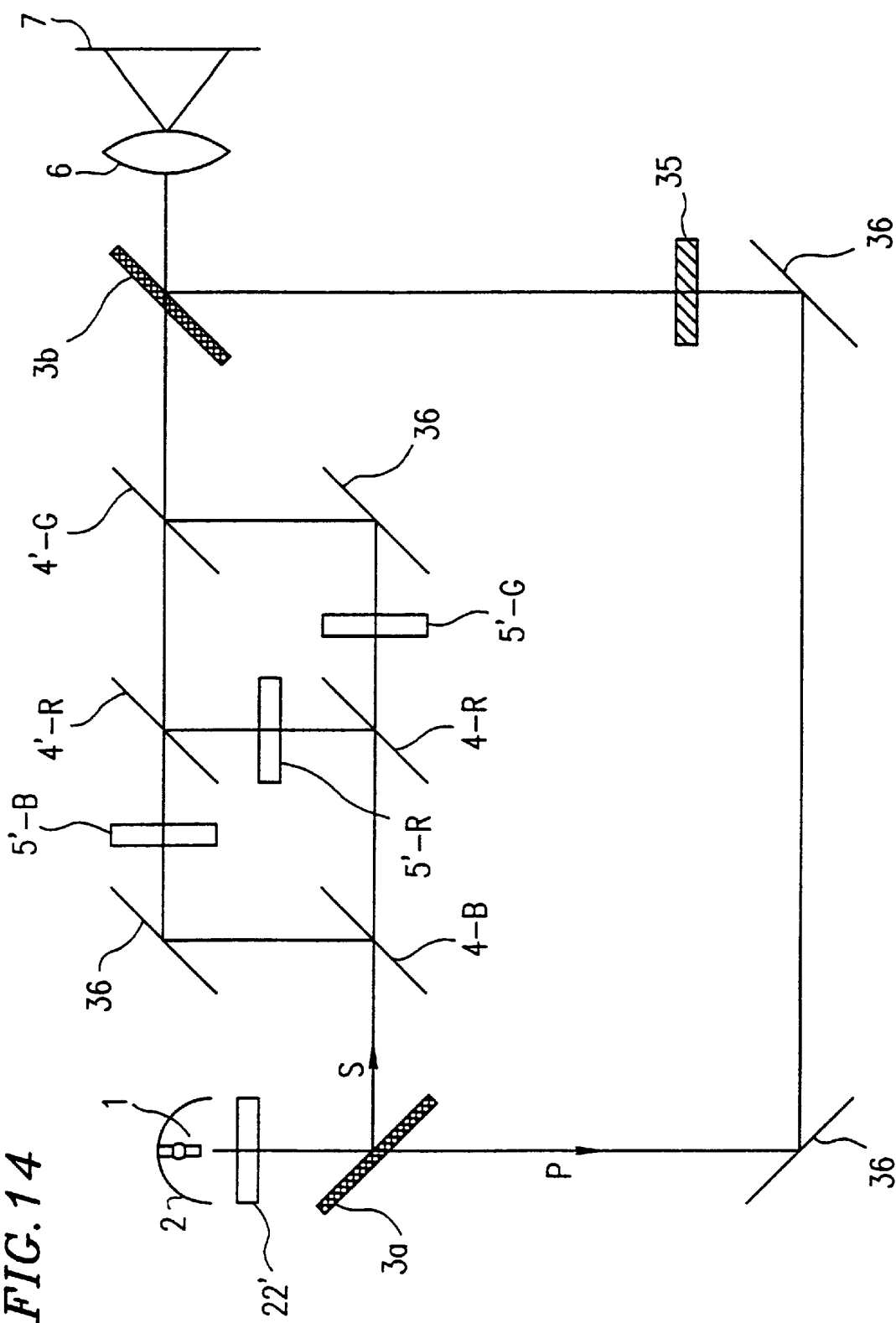
FIG. 14 is a schematic view of a projection type image display apparatus according to Example 3 of the present invention.

FIG. 14 is a schematic view of a projection type color image display apparatus according to Example 3 of the present invention. In the apparatus shown in FIG. 14, two polarization selective reflection films 3a and 3b are used. In the optical path connecting the polarization selective reflection films 3a and 3b, transmissive liquid crystal display panels 5'-R, 5'-G and 51-B are provided. The directions of the transmission axis and the reflection axis of the polarization selective reflection film 3a are the same as those of the transmission axis and the reflection axis of the polarization selective reflection film 3b respectively.

A light beam from a light source 1 which was reflected by a parabolic mirror 2 passes through an IR-UV cutting filter 22' which blocks unnecessary infrared radiation and ultraviolet radiation, and is incident upon the polarization selective reflection film 3a. The linearly polarized component of the incident light beam having a polarization plane which is parallel to the direction of the reflection axis of the polarization selective reflection film 3a is reflected while the linearly polarized component of the incident light beam having a polarization plane which is parallel to the direction of the transmission axis of the polarization selective reflection film 3a is transmitted.

In Example 3, the reflection axes of the polarization selective reflection films 3a and 3b are arranged to be perpendicular to the sheet of FIG. 14, and the transmission axes thereof are arranged to be horizontal to the sheet of FIG. 14.

The light beam reflected by the polarization selective reflection film 3a is incident upon a dichroic mirror 4-B which reflects a B light beam. The reflected B light beam is reflected by a total reflecting mirror 36 and is then incident upon the B transmissive liquid crystal display panel 5'-B.

R and G light beams pass through the dichroic mirror 4-B, and are incident upon a dichroic mirror 4-R which reflects the R light beam. The reflected R light beam is incident upon the R transmissive liquid crystal display panel 5'-R. The G light beam passes through the dichroic mirror 4-R and is incident upon the G transmissive liquid crystal display panel 5'-G.

Each of the transmissive liquid crystal display panels 5'-R, 5'-G and 5'-B rotates the polarization direction of the light beam in response to an image signal.

The B and R light beams which passed through the transmissive liquid crystal display panels 5'-B and 5'-R respectively are synthesized by a dichroic mirror 4'-R.

Then, the synthesized light beam including B and R components is incident upon a dichroic mirror 4'-G. The light beam which passed through the transmissive liquid crystal display panel 5'-G is reflected by a total reflecting mirror 36, and is then incident upon the dichroic mirror 4'-G. As a result, the R, G and B light beams are synthesized by the dichroic mirror 4'-G.

Thereafter, the synthesized light beam including R, G and B components is incident upon the other polarization selective reflection film 3b. Only the component of the incident linearly polarized light beam which had the polarization plane thereof rotated by 90° by the transmissive liquid crystal display panels 5'-R, 5'-G and 5'-B, passes through the polarization selective reflection film 3b, and is thus enlarged and projected on the screen 7 by the projection lens 6.

The linearly polarized light beam which passed through the polarization selective reflection film 3a is reflected by two total reflecting mirrors 36, and is then incident upon a liquid crystal display panel 35. The linearly polarized light beam which passed through the liquid crystal display panel 35 is further incident upon the polarization selective reflection film 3b. The component of the incident linearly polarized light beam which had the polarization direction thereof modulated by the liquid crystal display panel 35 in such a manner that the polarization plane thereof is rotated by 90° from the polarization plane at the time of incidence, is reflected by the polarization selective reflection film 3b. As a result, the reflected light beam passes through the projection lens 6, and is enlarged and projected on the screen 7 as a luminance signal light beam of an image.

The directions of the reflection axes and the transmission axes of the polarization selective reflection films 3a and 3b do not have to be perpendicular and horizontal to the sheet of FIG. 14 respectively as described above; the directions can be arbitrarily set in accordance with the characteristics of the liquid crystal display panel.

The polarization selective reflection films 3a and 3b have, inside the plane thereof, a transmission axis which transmits a particular linearly polarized light beam, and a reflection axis which reflects a linearly polarized light beam orthogonal to the above particular linearly polarized light beam. Accordingly, the transmitted light beam and the reflected light beam each become a linearly polarized light beam which has a polarization plane of one direction even if an illuminant light beam has a spreading angle. As a result, the contrast ratio of a display image is improved.

Additionally, since the directions of the transmission axes and the reflection axes of the polarization selective reflection films 3a and 3b can be arbitrarily set, the direction of the polarization vector of the transmitted light beam and the reflected light beam can be controlled. This makes it possible to adjust the polarization direction of the incident light beam to a preferable polarization direction with respect to the transmissive liquid crystal display panels 5'-R, 5'-G and 5'-B without using an optical element such as a quarter-wave plate.

Since the amount of glass PBS to be used can be reduced, the apparatus can be produced at a low cost, and a reduction in weight of the apparatus can be achieved.

Moreover, by performing color separation and synthesis in the optical path other than the portion between the polarization selective reflection element and the liquid crystal display element, a reduction in the contrast ratio due to the optical system for color separation and synthesis can be avoided.

As described above, according to the present invention, by using a film-like polarization selective reflection element having a small degree of birefringence, irregularity in the contrast can be eliminated, which leads to a realization of a bright image.

Furthermore, the projection type image display apparatus according to the present invention is provided with a polarization selective reflection element having an optical transmission axis which transmits a linearly polarized light beam of one direction, and an optical reflection axis which reflects a light beam orthogonal to the above linearly polarized light beam of one direction regardless of the angle of incidence. Accordingly, even if an illuminant light beam has a spreading angle, the transmitted light beam and the reflected light beam become linearly polarized light beams which are parallel to the transmission axis and the reflection axis respectively. This makes it possible to further improve the contrast ratio.

According to the present invention, since the direction of the transmission axis and the reflection axis of the polarization selective reflection film can be arbitrarily set, the direction of the polarization vector of the transmitted light beam and the reflected light beam can be controlled. This makes it possible to adjust the polarization direction of the incident light beam to a preferable polarization direction with respect to the reflective liquid crystal display panels without using an optical element such as a quarter-wave plate.

Moreover, three optical paths from the light source to the reflective liquid crystal display panels through which R, G and B light beams travel respectively, have substantially the same length. Accordingly, there is no shift in the white balance due to the difference in the length of the optical paths found in the conventional projection type image display apparatus, and a bright, satisfactory image can be achieved. Moreover, since a relay lens for transferring a light beam which was conventionally necessary to prevent a shift in the white balance is not required, the manufacturing costs can be reduced.

Furthermore, a multi-layer film for continuously reflecting a light beam which is on the longer or shorter wavelength side of the wavelength region of the G light beam, is provided on the reflection planes of the cross dichroic prism or the cross dichroic mirror for color separation. This makes it possible to produce an image display apparatus having excellent characteristics less expensively.

Additionally, since it is not necessary to provide a G reflection plane for the cross dichroic prism for color synthesis, an image display apparatus having excellent characteristics can be produced less expensively as in the case with the cross dichroic prism or the cross dichroic mirror.

Furthermore, the R and B light beams whose wavelength regions are separate from each other are each reflected by a corresponding reflection plane of the cross dichroic prism. Accordingly, even if a light beam having a certain angle with respect to the optical axis is incident upon the reflection plane and the spectral reflection characteristic of each reflection plane shifts from a designed value, there is no overlap in the spectra of the light beams reflected by the reflection planes. Accordingly, the light beams from the reflective liquid crystal display panels are respectively reflected by the corresponding reflection plane, most of which is incident upon the projection lens. As a result, a brighter image can be realized.

Moreover, by performing color separation and synthesis in the optical path other than the portion between the polarization selective reflection element and the liquid crystal display element, a reduction in the contrast ratio due to the optical system for color separation and synthesis can be avoided.

Furthermore, the use of a sheet-like polarization selective reflection element having a polarizing filter between a polarization selective reflection film and a glass substrate makes it possible to completely prevent the effect produced by birefringence of the glass substrate, and to further improve the contrast ratio.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A projection type image display apparatus, comprising:
   a light source;
   a first polarization selective reflection element having a function of reflecting or transmitting a light beam from the light source in accordance with a polarization direction thereof;
   a first element for modulating a polarization plane of an incident light beam in accordance with an image to be displayed;
   a projection lens for projecting the modulated light beam; and
   a polarizing filter for transmitting only a linearly polarized component of a light beam having one direction, said polarizing filter being located between at least one of the light source and the first polarization selective reflection element, and the first polarization selective reflection element and the protection lens,
   wherein the first polarization selective reflection element is film-like and has an optical transmission axis and an optical reflection axis,
   the first polarization selective reflection element transmits a first linearly polarized light beam, and reflects a second linearly polarized light beam having a polarization plane orthogonal to a polarization plane of the first linearly polarized light beam, regardless of a direction of incidence of a light beam with respect to the first polarization selective reflection element,
   the first polarization selective reflection element has a structure in which a polarization selective reflection film having a polarization selective reflection function is stacked on a polarizing filter for transmitting only a linearly polarized component of a light beam having one direction, the polarization selective reflection film being closer to the first element.

2. A projection type image display apparatus, comprising:
   a light source; a
   first polarization selective reflection element having a function of reflecting or transmitting a light beam from the light source in accordance with a polarization direction thereof;
   a first element for modulating a polarization plane of an incident light beam in accordance with an image to be displayed;
   a projection lens for projecting the modulated light beam; and
   polarizing filters for transmitting only a linearly polarized component of a light beam having one direction,
   wherein the polarization selective reflection element is film-like and has an optical transmission axis and an optical reflection axis,
   the polarization selective reflection element transmits a first linearly polarized light beam, and reflects a second linearly polarized light beam having a polarization plane orthogonal to a polarization plane of the first linearly polarized light beam, regardless of a direction of incidence of a light beam with respect to the polarization selective reflection element, and the polarizing filters including a first polarizing filter located between the light source and the polarization selective reflection element, and a second polarizing filter located between the polarization selective reflection element and the projection lens, the first and second polarizing filters being arranged in such a manner that the transmission axes thereof are in a crossed Nicols state with respect to the optical path.

3. A projection type image display apparatus according to claim 2, wherein the first element for modulating the polarization plane of an incident light beam is a reflective image display element, the reflective image display element receives the reflected or transmitted light beam from the first polarization selective reflection element, the light beam reflected by the reflective image display element is a modulated light beam which is incident upon the first polarization selective reflection element, and the modulated light beam is transmitted or reflected by the first polarization selective reflection element and is incident upon the projection lens.

4. A projection type image display apparatus according to claim 2, wherein the polarization selective reflection element has a structure in which, a polarization selective reflection film having a polarization selective reflection function is stacked on a polarizing filter for transmitting only a linearly polarized component of a light beam having one direction, the polarization selective reflection film being closer to the first element.

5. A projection type image display apparatus according to claim 2, further comprising:

a color separating element for separating a light beam from the light source into a plurality of light beams each having a different wavelength region;

a plurality of polarization selective reflection elements having a function of reflecting or transmitting a light beam from the light source in accordance with a polarization direction thereof the plurality of polarization selective reflection elements including the first polarization selective reflective element;

a plurality of elements for modulating a polarization plane of an incident light beam in accordance with an image to be displayed, the plurality of elements including the first element; and a color synthesizing element for synthesizing the plurality of light beams each having a different wavelength region, and wherein the plurality of polarization selective reflection elements and the plurality of reflective image display elements respectively correspond to the plurality of light beams each having a different wavelength region, the color separating element is provided in an optical path between the plurality of polarization selective reflection elements and the light source, and the color synthesizing element is provided in an optical path between the plurality of polarization selective reflection elements and the projection lens.

6. A projection type image display apparatus according to claim 2, wherein:

the first element is one of a plurality of elements, the apparatus further comprises in addition to the first polarization selective reflection element, a second polarization selective reflection element between the projection lens and the plurality of elements, light beams which have been reflected or transmitted by the first polarization selective reflection element and which have been modulated by the plurality of elements are synthesized by the second polarization selective reflection element to form a synthesized light beam, the light beams reflected or transmitted by the first polarization selective reflection element corresponding to the plurality of image display elements, respectively, and the synthesized light beam is incident upon the projection lens.

7. A projection type image display apparatus according to claim 2, further comprising a color separating element and a color synthesizing element wherein:

the first element comprises one of a plurality of reflective image display elements, the color separating element separates a light beam from the light source into a plurality of light beams each having a different wavelength region, the plurality of reflective image display elements respectively correspond to the plurality of light beams each having a different wavelength region, the color synthesizing element synthesizes the plurality of light beams each having a different wavelength region reflected by the plurality of reflective image display elements, the first polarization selective reflection element corresponds to the synthesized light beam having the different wavelength regions, and a single element is commonly used as the color separating element and the color synthesizing element.

8. A projection type image display apparatus according to claim 2, wherein the first linearly polarized light beam is parallel to the transmission axis and the second linearly polarized light beam is parallel to the reflection axis.

9. A projection type image display apparatus, comprising:

a light source;

a polarization selective reflection element for transmitting light from said light source of one polarization and reflecting light from said light source of another polarization, said polarization selective reflection element transmitting the light having the one polarization as a first linearly polarized light beam parallel to a transmission axis thereof and reflecting the light having the other polarization as a second linearly polarized light beam parallel to a reflection axis thereof;

a light modulating element for modulating a polarization of one of the first and second linearly polarized light beams in accordance with an image to be displayed;

a projection lens for projecting the modulated light beam; and polarizing filters for transmitting only a linearly polarized component of a light beam having one direction, the polarizing filters including a first polarizing filter located between the light source and the polarization selective reflection element, and a second polarizing filter located between the polarization selective reflection element and the projection lens, the first and second polarizing filters being arranged in such a manner that the transmission axes thereof are in a crossed Nicols state with respect to the optical path.

10. A projection type image display apparatus according to claim 9, further comprising:

a wavelength selecting element arranged in the light path between said polarization selective reflection element and said light modulating element for selecting light having a wavelength in a particular wavelength range from the one of the first and second linearly polarized light beams, whereby the selected light is modulated by said light modulating element.

11. A projection type image display apparatus according to claim 9, further comprising:

a wavelength selecting element arranged in the light path between said light source and said polarization selective reflection element for selecting light having a wavelength in a particular wavelength range from the light output by said light source, whereby the selected light is supplied to said polarization selective reflection element.

12. A projection type image display apparatus according to claim 9, wherein said polarization selective reflection element is arranged in the light path between said light modulating element and said projection lens.

13. A projection type image display apparatus according to claim 9, wherein said polarization selective reflection element comprises a polarization selective reflection film.

14. A projection type image display apparatus, comprising:

a light source;

a plurality of a polarization selective reflection elements each for transmitting light from said light source of one polarization and reflecting light from said light source of another polarization, each said polarization selective reflection element transmitting the light having the one polarization as a first linearly polarized light beam parallel to a transmission axis thereof and reflecting the light having the other polarization as a second linearly polarized light beam parallel to a reflection axis thereof;

light modulating elements, each light modulating element modulating a polarization plane of one of the first and second linearly polarized light beams of a corresponding one of said polarization selective reflection elements in accordance with an image to be displayed;

a synthesizing element for synthesizing the light beams modulated by said light modulating elements;

a projection lens for projecting the synthesized modulated light, and polarizing filters arranged in the light paths between said light source and each of said polarization selective reflection elements.

15. A projection type image display apparatus according to claim 14, wherein each of said polarization selective reflection elements comprises a polarization selective reflection film.

16. A projection type image display apparatus according to claim 14, wherein the light paths to each of the light modulating elements have substantially the same length in air equivalent.

17. A projection type image display apparatus, comprising:

a light source;

a plurality of a polarization selective reflection elements each for transmitting light from said light source of one polarization and reflecting light from said light source of another polarization, each said polarization selective reflection element transmitting the light having the one polarization as a first linearly polarized light beam parallel to a transmission axis thereof and reflecting the light having the other polarization as a second linearly polarized light beam parallel to a reflection axis thereof;

light modulating elements, each light modulating element modulating a polarization plane of one of the first and second linearly polarized light beams of a corresponding one of said polarization selective reflection elements in accordance with an image to be displayed;

a synthesizing element for synthesizing the light beams modulated by said light modulating elements;

a projection lens for projecting the synthesized modulated light; and polarizing filters for transmitting only a linearly polarized component of a light beam having one direction, the polarizing filters including first polarizing filters each of which is located between the light source and one of the polarization selective reflection elements, and second polarizing filters each of which is located between one of the polarization selective reflection elements and the projection lens, the first and second polarizing filters being arranged in such a manner that the transmission axes of respective pairs of first and second polarizing filters are in a crossed Nicols state with respect to the optical path.

18. A projection type image display apparatus, comprising:

a light source;

a first polarization selective reflection element having a function of reflecting or transmitting a light beam from the light source in accordance with a polarization direction thereof;

a first element for modulating a polarization plane of an incident light beam in accordance with an image to be displayed; and a projection lens for projecting the modulated light beam, wherein the first polarization selective reflection element is film-like and has an optical transmission axis and an optical reflection axis, the first polarization selective reflection element transmits a first linearly polarized light beam, and reflects a second linearly polarized light beam having a polarization plane orthogonal to a polarization plane of the first linearly polarized light beam, regardless of a direction of incidence of a light beam with respect to the first polarization selective reflection element, wherein the first element is one of a plurality of elements, the apparatus further comprises in addition to the first polarization selective reflection element, a second polarization selective reflection element between the projection lens and the plurality of elements, light beams which have been reflected or transmitted by the first polarization selective reflection element and which have been modulated by the plurality of elements are synthesized by the second polarization selective reflection element to form a synthesized light beam, the light beams reflected or transmitted by the first polarization selective reflection element corresponding to the plurality of image display elements, respectively, and the synthesized light beam is incident upon the projection lens.

19. A projection type image display apparatus according to claim 17, wherein the light paths to each of the light modulating elements have substantially the same length in air equivalent.

20. A projection type image display apparatus according to claim 17, wherein each of said polarization selective reflection elements comprises a polarization selective reflection film.

* * * * *